United States Patent [19]

Fieldhouse

[11] Patent Number: 4,526,498

[45] Date of Patent: Jul. 2, 1985

[54] KEY FORMING MACHINE

[75] Inventor: Raymond Fieldhouse, Launceston, Australia

[73] Assignee: Lloyd Matheson, Inc., Charlestown, N.H.

[21] Appl. No.: 400,230

[22] Filed: Jul. 20, 1982

[30] Foreign Application Priority Data

Jul. 30, 1981 [AU] Australia ............... PE9999

[51] Int. Cl.$^3$ .............................................. B23C 3/35
[52] U.S. Cl. ...................................... 409/82; 409/83; 74/568 R
[58] Field of Search ....................... 409/82, 83, 79, 81; 82/34 D; 29/43, 44, 65; 408/13, 69, 70, 241 S; 74/568 R, 568 M

[56] References Cited

U.S. PATENT DOCUMENTS

| 1,628,638 | 5/1927 | Shaw | 409/82 |
| 1,923,164 | 8/1933 | Roos | 409/82 |
| 2,098,728 | 11/1937 | McPhee | 409/82 |
| 2,129,087 | 9/1938 | George et al. | 409/82 |
| 3,011,411 | 12/1961 | Raymond | 409/82 |
| 3,469,498 | 9/1969 | Adler et al. | 409/82 |
| 3,919,920 | 11/1975 | Schlage | 409/82 |
| 3,998,114 | 12/1976 | Nevery | 82/34 D |

FOREIGN PATENT DOCUMENTS 1016100 10/1952 France ................... 409/81

Primary Examiner—Gil Weidenfeld
Assistant Examiner—Daniel W. Howell
Attorney, Agent, or Firm—Mason, Fenwick & Lawrence

[57] ABSTRACT

A key forming machine including a machine frame, key cutting means mounted on the machine frame and operable to cut bittings of preselected location and depth into a key blank to form a key, and a carriage assembly adapted to carry a key blank and mounted on the machine frame for movement for presentation of the key blank to the key cutting means. First and second indexing mechanisms ar mounted on the machine frame and operable to move the carriage assembly, for presentation of a carried key blank to the key cutting means, to indexed positions respectively corresponding to preselected bitting locations and bitting depths. The indexing mechanisms each include an interengageable cam element and follower element, each cam element defining at least one series of discrete land portions representative of the indexed positions of the carriage assembly. The cam elements are separately movable to interengage a selected one of the land portions thereof with the respective follower element, that movement causing coaction between the cam elements and respective follower elements to move the carriage assembly to the indexed positions represented by the selected land portions and so present the carried key blank to the key cutting means for cutting a bitting at the corresponding bitting location and bitting depth.

7 Claims, 5 Drawing Figures

KEY FORMING MACHINE

This invention relates generally to key forming machines and particularly to machines for cutting key blanks from key codes to form keys. The machine may be useful for forming paracentric keys, and it will be convenient to hereinafter describe the machine in relation to that example application. It should be appreciated, however, that the invention is not limited to that example application.

A variety of machines have been developed for cutting key blanks from codes allowed for by key controlled lock manufacturers. All of the machines currently commercially available were developed some years ago and, whilst satisfactorily forming keys when regularly maintained and adjusted and diligently operated, have a tendency to form keys which do not accurately conform to the codes when used over any period of time without that maintenance, adjustment or operation. Commercial users of such machines are not renowned for their conscientiousness when it comes to maintenance, adjustment, and operation of such machines so that many keys are formed which do not operate their corresponding locks.

Inaccuracy in these prior machines generally arises from the indexing mechanisms by which the codes are translated into key blank positions in the machines. Incorrect fitting, loose fitting, damage and wear of those indexing mechanisms can quite easily occur to contribute to that inaccuracy. In addition, some of those mechanisms are particularly error prone, unless considerable skill and attention is paid to machine setting. Thus, in practice, prior key forming machines are not entirely satisfactory.

It is an object of the present invention to provide a key forming machine which is relatively simple in both construction and operation and leads to alleviation of the various problems, as highlighted above, associated with prior machines.

According to the present invention, there is provided a key forming machine including: a machine frame; key cutting means mounted on the machine frame and operable to cut bittings of preselected location and depth into a key blank presented thereto to form a key; a carriage assembly adapted to carry a key blank and mounted on the machine frame for movement relative thereto for presentation of the key blank to the key cutting means; and, a first indexing mechanism mounted on the machine frame and operable to move the carriage assembly, for presentation of a carried key blank to the key cutting means, to first indexed positions corresponding to one of either preselected bitting locations or bitting depths, the first indexing mechanism including an interengageable first cam element and first follower element, the first cam element defining at least one series of discrete land portions representative of the first indexed positions of the carriage assembly, and the first cam element being movable to interengage a selected one of the land portions thereof with the first follower element, that movement causing coaction between the first cam element and the first follower element to move the carriage assembly to that first indexed position represented by the selected land portion and thereby present the carried key blank to the key cutting means for cutting a bitting at the corresponding bitting location or bitting depth.

The key forming machine of the present invention is hereinafter described with reference to its normal use orientation and terms such as "upper" and "lower" should be construed on the basis of this orientation. It should be appreciated, however, that other orientations may be equally possible and in which orientation alterations to terms such as those above may be necessary for a complete and proper understanding of the present invention.

The paracentric key blank to which this key forming machine is particularly applicable generally includes a head portion and an elongated blank portion extending integrally from one side of the head portion. The blade portion generally includes a pair of parallel spaced apart elongated side faces and spaced apart upper and lower edge faces extending therebetween, and one or more paracentric grooves extend along each side face. A collar stop is generally located on the upper and/or lower edge faces of the blade portion adjacent the head portion and is used as a reference in the cutting of the blank. A series of spaced apart bittings extend along the upper edge face, and may also extend along the lower edge face, forming the key blank into a key. Those bittings are generally of a particular shape and located along the edge face(s) at a constant or varying pitch, and varying depth according to a code allowed for by a manufacturer of the lock with which the key is to be used.

The following description refers in more detail to the above and other features of the present invention. To facilitate an understanding of the invention, reference is made to the accompanying drawings where these features are illustrated in a preferred embodiment. It should be understood, however, that the features of the invention are not limited to the specific embodiments of the features as illustrated in the drawings.

Figure 1:
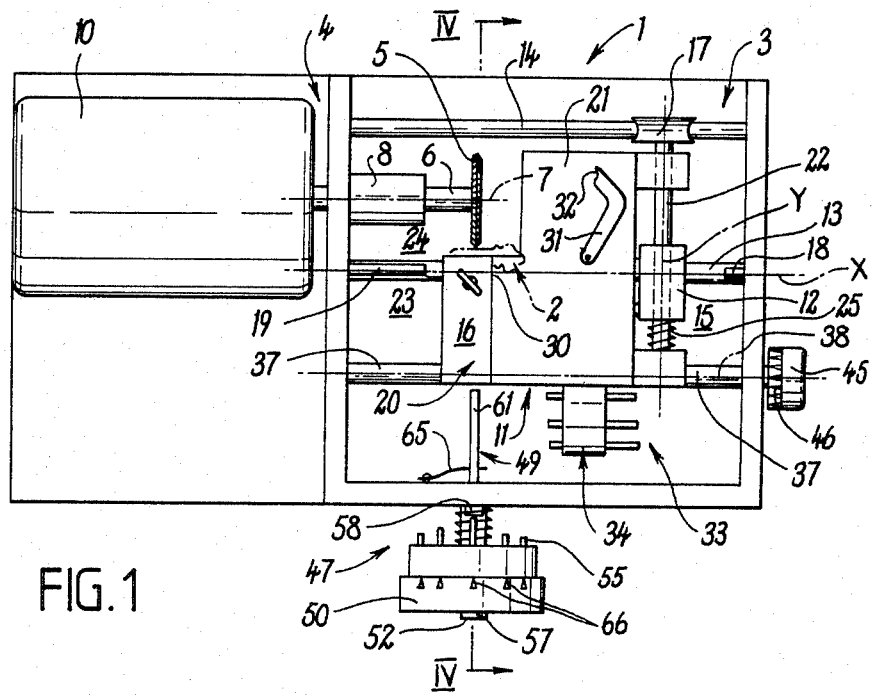
FIG. 1 is a top plan view of a key forming machine according to a preferred embodiment of the present invention.
Figure 2:
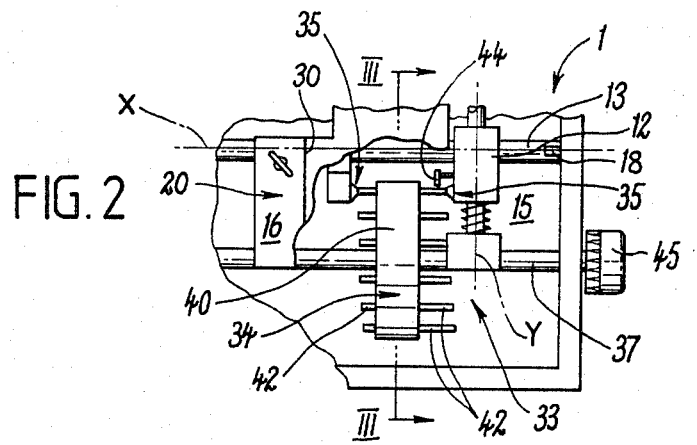
FIG. 2 is a fragmentary top plan view of the machine of FIG. 1.
Figure 3:
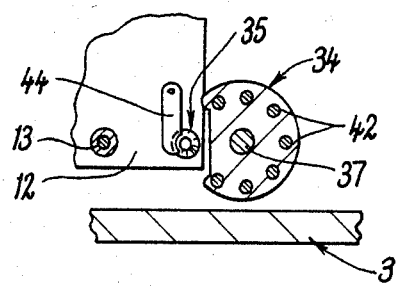
FIG. 3 is a cross-sectional view taken through III—III of FIG. 2.
Figure 4:
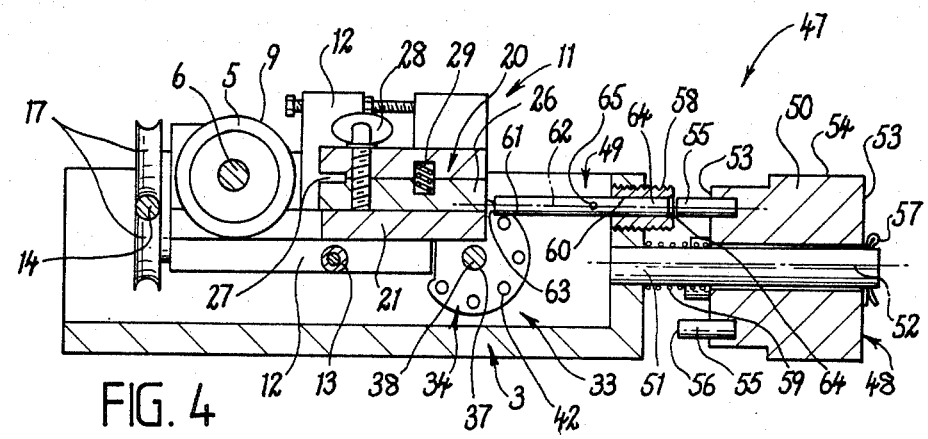
FIG. 4 is a cross-sectional view taken through IV—IV of FIG. 1.
Figure 5:
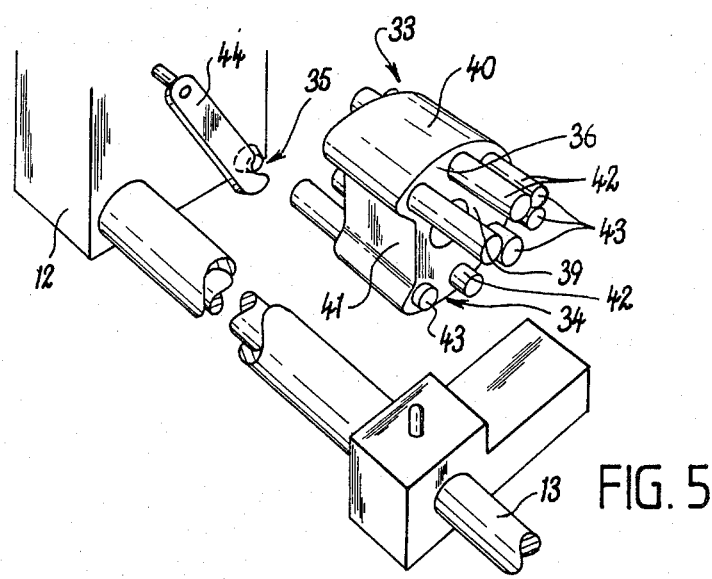
FIG. 5 is an exploded perspective view of a part of the machine of FIG. 1.

Referring to the drawings there is generally shown key forming machine 1, for cutting bittings in paracentric key blank 2, mounted in machine 1. Machine 1, includes machine frame 3, of solid construction, being formed from cast metal or fabricated from suitable heavy gauge metal. Mounted on machine frame 3, is key cutting means 4, operable to cut bittings into key blank 2. Key cutting means 4, includes cutting blade 5, removably mounted on drive shaft 6, for rotation about central drive axis 7. Drive shaft 6, is rotatably journalled in bearing 8, mounted on machine frame 3. Cutting blade 5, is disc-shaped with a plurality of cutting teeth 9, formed about the periphery thereof, those cutting teeth 9, having a profile determined by the shape of key bittings which it is desired to cut into key blank 2.

Key cutting means 4, also includes drive motor 10, mounted on machine frame 3, and connected to drive shaft 6, operation of motor 10, rotating drive shaft 6, and thus cutting blade 5. Drive motor 10, may be electrically operated.

Machine 1, also includes carriage assembly 11, adapted to carry key blank 2, for presentation to cutting blade 5, for cutting bittings therein. Carriage assembly 11, includes carriage frame 12, mounted on parallel spaced apart guide rods 13,14, for constrained linear movement of carriage assembly 11, along bitting location axis X, between key loading station 15, remote from cutting blade 5, and key presentation station 16, located adjacent cutting blade 5, (and as specifically illustrated in the drawings). Guide rod 13, is fixed in machine frame 3, and carriage frame 12, is mounted thereon for sliding movement therealong. Guide rod 14, is also fixed in machine frame 3, whilst carriage frame 12, is mounted thereon through a pair of guide wheels 17, rotatably mounted on carriage frame 12, with guide rod 14, extending therebetween. Thus, as carriage assembly 11, is moved along bitting location axis X, carriage frame 12, slides along guide rod 13, and guide wheels 17, roll along guide rod 14.

Carriage assembly 11, also includes opposed limit stops 18,19, for limiting movement of carriage frame 12, along bitting location axis X, and thus determining key loading station 15, and key presentation station 16, locations relative to machine frame 3, and key cutting means 4.

Carriage assembly 11, further includes key clamp member 20, mounted on carriage frame 12, and adapted to securely hold key blank 2, therein. Key clamp member 20, includes base portion 21, mounted on guide shaft 22, firmly mounted on carriage frame 12, for constrained linear movement of key clamp member 20, relative to carriage frame 12, along bitting depth axis Y, between key dwell station 23, where key blank 2, is spaced from cutting blade 5, (as specifically illustrated in the drawings) and key cutting station 24, where key blank 2, is positioned at cutting blade 5, for cutting bittings therein. Base portion 21, is biased into key dwell station 23, by biasing spring 25, mounted on guide shaft 22, and acting between carriage frame 12, and base portion 21.

Key clamp member 20, also includes a pair of separable vice jaws 26, mounted on base portion 21, for movement therewith. Vice jaws 26, define jaw opening 27, for receipt of key blank 2, jaws 26, being closable about key blank 2, by control screw 28. Bias spring 29, is provided between vice jaws 26, to bias them apart in order to facilitate loading of key blank 2, in opening 27.

Vice jaws 26, provide location shoulder 30, thereon against which a collar stop of key blank 2, can abut for correct location of key blank 2, in jaw opening 27. Key clamp member 20, can also include location arm 31, pivotably mounted on base portion 21, and defining further location shoulder 32, location arm 31, being pivotable to abut location shoulder 32, against a collar stop of key blank 2, and thereby also correctly locate key blank 2, within jaw opening 27.

Machine 1, also includes first (pitch) indexing mechanism 33, operable to controllably move carriage assembly 11, along bitting location axis X, so as to present key blank 2, to the cutting blade 5, at indexed positions corresponding to preselected bitting locations in key blank 2. Pitch indexing mechanism 33, includes pitch indexing cam 34, and a pair of pitch cam followers 35, interengageable when carriage assembly 11, is in key presentation station 16.

Pitch indexing cam 34, includes cam body 36, rigidly but removably mounted on mounting shaft 37, which is removably mounted and located endwise in machine frame 3, for rotation about cam axis 38. Cam body 36, is generally disc-shaped, having a pair of spaced apart side faces 39, interconnected by peripheral edge face 40, with peripheral section 41, being removed therefrom.

Pitch indexing cam 34, also includes a series of indexing posts 42, mounted in cam body 36, and outstanding from each side face 39, thereof. Opposed flat end faces 43, of each indexing post 42, each define a cam surface land portion representative of one respective indexed position of carriage assembly 11, in key presentation station 16, corresponding to a preselected bitting location in key blank 2.

Pitch cam followers 35, are mounted in opposed spaced apart relationship on carriage frame 12, so that during machine use, indexing posts 42, can extend therebetween with flat end faces 43, thereof directly and positively engaging a respective flat cam face of one of cam followers 35. Pitch cam followers 35, may be of generally frustoconical shape or otherwise ramped to facilitate engagement of end faces 43, of successive indexing posts 42, therewith upon rotation of pitch indexing cam 34.

Pitch indexing mechanism 33, is provided with location pawl 44, mounted on carriage frame 12, and releasably engageable with indexing posts 42, to firmly and positively locate successive indexing posts 42, in engagement with cam followers 35.

Pitch indexing mechanism 33, further includes control dial 45, rigidly mounted on mounting shaft 37, for manual gripping by a machine operator to enable manual rotation of mounting shaft 37, and pitch indexing cam 34. Control dial 45, is provided with indicia 46, indicative of whether or not pitch indexing cam 34, and cam followers 35, are engaged or disengaged and, if engaged, which indexing post 42, thereof engages cam followers 35.

Machine 1, also includes second (depth) indexing mechanism 47, mounted on machine frame 3, and operable to controllably move key clamp member 20, along bitting depth axis Y, for presentation of key blank 2, to cutting blade 5, at indexed positions corresponding to preselected bitting depths in key blank 2. Depth indexing mechanism 47, includes interengageable depth indexing cam 48, and depth cam follower 49.

Depth indexing cam 48, includes cam body 50, mounted on rigidly fixed mounting shaft 51, for rotation about and limited sliding movement along cam axis 52. Cam body 50, is generally cylindrical shaped and has a pair of parallel spaced apart end faces 53, interconnected by peripheral side face 54, which can be manually gripped by a machine operator for movement of depth indexing cam 48.

Depth indexing cam 48, also includes a series of indexing posts 55, mounting in cam body 50, and outstanding from one end face 53, thereof. Terminal end faces 56, of each indexing post 55, define a cam surface land portion representative of one respective indexed position of carriage assembly 11, corresponding to a preselected bitting depth in key blank 2.

Linear movement of depth indexing cam 48, along mounting shaft 51, is limited to between a pair of spaced apart cam stops 57,58, on mounting shaft 51, and machine frame 3, respectively. Cam stop 57, is in the form of a removable pin against which one end face 53, abuts to limit movement of depth indexing cam 48, away from depth cam follower 49. Cam stop 58, is in the form of a guide sleeve against which opposite end face 53, abuts to limit movement of cam 48, toward cam follower 49.

Cam stop 58, may be adjustable so as to allow variation in the linear movement of depth indexing cam 48. Depth indexing cam 48, is resiliently biased against cam stop 57, by biasing spring 59, mounted on mounting shaft 51, and coacting between machine frame 3, and opposite end face 53.

Rotational movement of depth indexing cam 48, is generally unimpeded when biased against cam stop 57. However, when linear movement of depth indexing cam 48, toward cam stop 58, occurs rotational movement is then prevented by a selected indexing post 55, entering guide bore 60, in cam stop 58, to engage with depth cam follower 49.

Depth cam follower 49, is mounted on machine frame 3, and includes elongate push rod 61, mounted in guide bore 60, in cam stop 58, for longitudinal sliding movement along axis 62, relative to machine frame 3. Push rod 61, is so positioned that one end portion 63, thereof can engage one vice jaw 26, whilst other end portion 64, thereof can be engaged by a selected indexing post 55, coaxially aligned therewith, upon limited linear movement of depth indexing cam 48. Cam follower 49, also includes biasing spring 65, extending between machine frame 3, and push rod 61, so as to urge push rod 61, to move out of engagement with vice jaw 26, spring 65, abutting cam stop 58, to limit that movement out of engagement.

Depth indexing cam 48, is provided with indicia 66, identifying indexing posts 55, and particularly the bitting depth to which those indexing posts 55, correspond.

In order to further understand the present invention, the operation of the above outlined preferred embodiment of key forming machine 1, will now be outlined.

Initially, pitch and depth indexing cams 34,48, and cutting blade 5, are selected according to the location, depth, and shape of bittings to be cut into key blank 2, and then mounted in machine 1. With drive motor 10, not operating, pitch indexing cam 34, and pitch cam followers 35, disengaged, by aligning removed peripheral section 41, with cam followers 35, carriage assembly 11, abutting limit stop 18, and with vice jaws 26, in key dwell station 23, key blank 2, is mounted in jaw opening 27, of vice jaws 26, so that the upper edge face can be presented to cutting blade 5, for the cutting of bittings therein. That mounting is achieved by opening vice jaws 26, positioning the blade portion of key blank 2, therebetween until the lower edge face and any collar stop thereon abuts location shoulder 30, and thereafter closing vice jaws 26, to clamp key blank 2, therebetween. Where there is no collar stop on the lower edge face the blade portion of key blank 2, is positioned between vice jaws 26, location arm 31, is pivoted and key blank 2, moved until location shoulder 32, abuts the collar stop on the upper edge face of key blank 2, so as to locate key blank 2.

Carriage assembly 11, is then manually moved along bitting location axis X, from key loading position 15, to the key presentation station 16, until carriage assembly 11, abuts limit stop 19. Drive motor 10, is then operated to commence rotation of cutting blade 5.

As indicated by the code for key blank 2, control dial 45, of pitch indexing assembly 33, is progressively rotated to each indicia 46, thereon to bring respective flat end faces 43, of successive indexing posts 42, into positive engagement with the flat cam faces of cam followers 35. That rotation to engagement causes successive indexing posts 42, to coact with cam followers 35, to progressively stepwise move carriage assembly 11, within key presentation station 16, toward key loading station 15, with each engagement bringing carriage assembly 11, to a dead stop so that key blank 2, is positively located at a corresponding bitting location.

At one, several or each indicia 46, a bitting may be cut into key blank 2. That is achieved, at each bitting location, by rotating depth indexing cam 48, about cam axis 52, to indicia 66, identifying that indexed position corresponding to the coded bitting depth to be cut in key blank 2. That rotation aligns indexing post 55, corresponding to the bitting depth with push rod 61, and subsequent limited linear movement of depth indexing cam 48, against the bias of spring 59, pushes push rod 61, which in turn pushes key clamp member 20, into key cutting station 24. That movement of key clamp member 20, which continues until depth indexing cam 48, abuts limit stop 58, pushes key blank 2, into rotating cutting blade 5, to the indexed position and thereby cuts the bitting therein.

Following cutting of that bitting, manual release of depth indexing cam 48, causes key clamp member 20, to return to key dwell station 23, push rod 61, to disengage from vice jaw 26, and depth indexing cam 48, to disengage from push rod 61, under bias of their separate respective biasing springs 25,65,59.

Following completion of the cutting of bittings in key blank 2, control dial 45, is moved to disengage pitch indexing cam 34, and pitch cam followers 35, and allow manual withdrawal of carriage assembly 11, from key presentation station 16, to key loading station 15. At loading station 15, the formed key can be removed from vice jaws 26, and where necessary bittings similarly cut in the lower edge face thereof.

A key forming machine according to the present invention provides indexing mechanisms which can positively locate a key blank for cutting and is so arranged as to minimize both wear in and the necessity for adjustment of those mechanisms. As such, it is envisaged that the key forming machine may accurately cut key blanks over long periods of time without the necessity for adjustment or maintenance.

In addition, the indexing mechanisms are so arranged that there is little likelihood of user error in programming the machine to cut key blanks according to bitting codes. Thus, the machine may be used to accurately form keys even though operated by relatively unskilled persons.

The machine is of relatively simple yet sturdy construction so that costs of production and maintenance may be minimal.

In a preferred form of the key forming machine, the components of the indexing mechanisms which control indexing positions of the key blank can be readily interchanged without disturbing the overall accuracy of the machine. This allows a wide range of key types to be accurately formed on the machine.

Finally, it is to be understood that various modifications and/or alterations may be made to the above outlined preferred embodiment without departing from the ambit of the present invention as defined in the claims appended hereto. In one particular modification of that embodiment, pitch indexing cam 34, may have indexing posts 42, outstanding from one side face 39, thereof only so that one end face 43, of each indexing post 42, only defines a cam surface land portion. Only one pitch cam follower 35, need be mounted on carriage frame 12, for interengagement with indexing posts 42, of this pitching indexing cam 34. With this modification, a biasing member, such as a coil spring is provided so as to bias carriage frame 12, in order to urge the one pitch cam follower 35, into and maintain engagement with a selected one of the indexing posts 42. The spring may be mounted on guide rod 13, so that carriage frame 12, when in key presentation station 16, is biased toward key loading station 15, and the indexing posts 42, may protect from cam body 36, toward key presentation station 16, so as to be capable in machine use to resist that biasing and so control movement of carriage frame 12, toward key loading station 15.

I claim:

1. A key forming machine including: a machine frame; key forming means mounted on the machine frame and operable to form bittings of preselected location and depth into a key blank presented thereto to form a key; a carriage assembly adapted to carry a key blank and mounted on the machine frame for linear movement relative thereto for presentation of the key blank to the key forming means; and, a first indexing mechanism operable to move the carriage assembly, for presentation of a carried key blank to the key forming means to first indexed positions corresponding to one of either preselected bitting locations or bitting depths, the first indexing mechanism including an interengageable first cam element and first follower element, the first cam element having a cam body mounted for rotation about a cam axis and a series of separate indexing posts rigidly carried by the cam body so as to extend in spaced apart relation about and parallel to the cam axis, the indexing posts being of equal effective length and arranged axially offset relative to each other along the cam axis, each indexing post having opposed end faces defining a pair of discrete land portions representative of a respective one first indexed position of the carriage assembly, and the first follower element including a pair of first cam followers mounted spaced apart from each other and radially offset from the cam axis with each first cam follower having a cam face, the first follower element being located adjacent the first cam element during machine use so that the first cam element can be rotated about the cam axis to bring each indexing post in turn into direct camming engagement with both of the first cam followers, continued rotation of the first cam element upon camming engagement between any one indexing post and the first cam followers causing the first cam followers and first cam element to move linearly relative to each other and parallel to the cam axis until the one indexing post extends between, and each of the end faces thereof abuts a respective one of, the cam faces of the first cam followers to thereby positively linearly locate the first cam element and first follower element relative to each other, the relative linear movement between the first cam followers and first cam element linearly moving the carriage assembly to the first indexed position represented by the one indexing post to thereby present the carried key blank to the key forming means for forming a bitting at the corresponding bitting location or bitting depth.

2. A machine as claimed in claim 1, and further including a second indexing mechanism mounted on the machine frame and operable to move the carriage assembly for presentation of a carried key blank to the key cutting means to second indexed positions corresponding to the other one of either preselected bitting locations or bitting depths, the second indexing mechanism including an interengageable second cam element and second follower element, the second cam element defining at least one series of discrete land portions representative of the second indexed positions of the carriage assembly, and the second cam element being movable to interengage a selected one of the land portions thereof with the second follower element and thereafter movable to move the second follower element causing the carriage assembly to move to that second indexed position represented by the selected land portion and thereby present the carried key blank to the key cutting means for cutting a bitting at the corresponding bitting location or bitting depth.

3. A machine as claimed in claim 2, wherein the second cam element is mounted on the machine frame for rotational and limited sliding movement, and the second cam element includes a series of indexing posts each having an end face which defines a land portion representative of a respective one second indexed position of the carriage assembly; and, wherein the second follower element includes an elongate second cam follower longitudinally slidably mounted on the machine frame for engagement with the carriage assembly so that rotational movement of the second cam element causes a selected one of the indexing posts thereof to longitudinally align with the second cam follower and subsequent limited sliding movement of the second cam element causes that one selected indexing post to engage and responsively slidably move the second cam follower into engagement with the carriage assembly and thereafter move the carriage assembly to the second indexed position represented by the selected one indexing post.

4. A machine as claimed in claim 2, wherein the carriage assembly is movable between a key loading station remote from the key cutting means and a key presentation station adjacent the key cutting means, the first and second indexing mechanisms being operable to move the carriage for presentation of a carried key blank to the key cutting means only at the key presentation station, and the cam and follower elements of the first and second indexing mechanisms being disengageable in the key cutting station to allow free movement of the carriage assembly between the key loading and presentation stations.

5. A machine as claimed in claim 2, wherein the carriage assembly includes a carriage frame and a key clamp member mounted thereon for securely holding a key blank, the key clamp member being mounted for movement relative to the carriage frame in response to operation of the second indexing mechanism.

6. A machine as claimed in claim 5, wherein the key clamp member is movable between a key cutting station where a key blank held by the key clamp member is positioned for cutting by the key cutting means, and a key dwell station where the key blank is not so positioned for cutting, the key clamp member being biased into the key dwell station and movable against that bias into the key cutting station by the second indexing mechanism.

7. A machine as claimed in claim 2, wherein the first and second indexing mechanisms are arranged so as to be operable to move the carriage assembly to indexed positions corresponding to, respectively, preselected bitting locations and bitting depths, operation of the first indexing mechanism followed by the second indexing mechanism presenting a carried key blank to the key cutting means for cutting a bitting of preselected location and depth.

* * * * *